US012246506B2

(12) United States Patent
Hamilton et al.

(10) Patent No.: US 12,246,506 B2
(45) Date of Patent: Mar. 11, 2025

(54) RAM LINER

(71) Applicant: Honeywell Federal Manufacturing & Technologies, LLC, Kansas City, MO (US)

(72) Inventors: Samuel James Hamilton, Kansas City, MO (US); Ruben Arturo Pino, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 501 days.

(21) Appl. No.: 17/590,997

(22) Filed: Feb. 2, 2022

(65) Prior Publication Data

US 2023/0241854 A1 Aug. 3, 2023

(51) Int. Cl.
*B30B 15/06* (2006.01)
*B30B 9/30* (2006.01)

(52) U.S. Cl.
CPC .......... *B30B 15/065* (2013.01); *B30B 9/3021* (2013.01)

(58) Field of Classification Search
CPC ........... B30B 15/065; B30B 9/04; B30B 9/26; B30B 9/3021
See application file for complete search history.

(56) References Cited

U.S. PATENT DOCUMENTS

| | | | | |
|---|---|---|---|---|
| 3,227,305 | A | 1/1966 | Bruno | |
| 3,965,814 | A | 6/1976 | Manko | |
| 4,554,868 | A * | 11/1985 | Zimmer | B30B 9/3042 454/307 |
| 4,658,989 | A | 4/1987 | Bonerb | |
| 5,001,977 | A | 3/1991 | Tracy | |
| 6,905,314 | B2 | 6/2005 | Danby | |
| 8,454,822 | B2 | 6/2013 | Morrissey et al. | |
| 9,878,511 | B2 * | 1/2018 | Fragstein | B30B 15/026 |
| 11,617,466 | B2 * | 4/2023 | Zhang | A47J 19/023 99/495 |
| 2006/0249535 | A1 | 11/2006 | Mauger et al. | |

* cited by examiner

*Primary Examiner* — Matthew Katcoff
(74) *Attorney, Agent, or Firm* — Hovey Williams LLP

(57) ABSTRACT

A liner for a ram configured to press a viscous material. The liner includes a liner wall and a circumferential lip. The liner wall is configured to abut a ram plate of the ram and includes a number of apertures configured to align with apertures of the ram plate. The liner wall and circumferential lip are configured to prevent the viscous material from contacting a ram surface and circumferential surface of the ram plate, thus making the ram easier to clean.

18 Claims, 6 Drawing Sheets

RAM LINER

GOVERNMENT INTERESTS

This invention was made with Government support under Contract No.: DE-NA0002839 awarded by the United States Department of Energy/National Nuclear Security Administration. The Government has certain rights in the invention.

BACKGROUND

Pail rams are often used to down-pack viscous material from large containers into syringes and other small containers via a ram plate pressed against the viscous material. The ram plate must be cleaned when down-packing is finished or when switching to a different material. This is difficult and time-consuming.

SUMMARY

Embodiments of the invention solve the above-mentioned problems and other problems and provide a distinct advancement in the art of pail rams and other material transfer systems. More particularly, the invention provides a ram liner that simplifies cleaning of a material transfer system.

An embodiment of the invention is a material transfer system incorporating a ram liner. The material transfer system presses a viscous material in a large container and broadly comprises a ram and a number of syringes to be filled with the viscous material.

The ram includes a ram plate, an actuator, a number of valves, and a number of plugs. The ram may be configured to accommodate other syringes or combinations of syringes.

The ram plate includes a ram surface, a circumferential surface, and a number of apertures. The ram plate is configured to be pressed into an open-topped container to compress a viscous material in the open-topped container so that some of the viscous material fills the syringes.

The circumferential surface extends around a periphery of the ram plate. It may be desirable to prevent material from contacting the circumferential surface. The circumferential surface helps retain the ram liner on the ram.

The apertures extend through the ram plate and are spaced apart from each other to accommodate the syringes. The apertures include a first set of apertures, a second set of apertures, and a central aperture.

The actuator includes legs driven by a force generator such as a hydraulic, pneumatic, or electric motor. The actuator is configured to urge the ram plate into the open-topped container.

The valves are positioned on the ram plate opposite the ram surface and are in fluid connection with the first set of apertures. The valves are configured to selectively partition material that has been pushed into the syringes from the rest of the material. This helps retain the material when the ram is retracted from the open-topped container and may ease removal of the ram from the open-topped container.

The plugs are configured to close the second set of apertures and the central aperture when they are not in use. The plugs are configured to be removed from the second set of apertures and the central apertures to accommodate syringes of different sizes or connection types.

The syringes are configured to be connected to the ram plate via the valves for filling with material. Syringes of different sizes or connection types may also be connected to the ram plate by removing the syringes and the plugs. This may require the above-mentioned valves or a different set of valves.

The ram liner broadly comprises a liner wall and a circumferential lip. The ram liner may be made of a thin plastic material and may be formed via molding, additive manufacturing, subtractive manufacturing, or the like.

The liner wall is a substantially circular disc configured to abut the ram surface of the ram plate and includes a number of knock-out tabs. The ram liner wall is convex (from above) for closely matching a concave shape of the ram surface. The ram liner wall is configured to prevent the viscous material from contacting the ram surface.

The knock-out tabs include a first set of knock-out tabs, a second set of knock-out tabs, and a central knock-out tab. Other numbers and arrangements of knock-out tabs may also be used to accommodate different rams.

Each of the first set of knock-out tabs is larger than the second set of knock-out tabs and they are equally spaced apart from each other around the center of the ram liner. Each of the second set of knock-out tabs is smaller than the first set of knock-out tabs and may be equally spaced from each other between the first set of knock-out tabs.

The knock-out tabs are circular discs having circumferential indentations for being sheared off from a remainder of the liner wall. The liner wall forms a number of apertures upon removal of the knock-out tabs.

The apertures of the ram liner have the same arrangement and configuration as the knock-out tabs. That is, the apertures include a first set of apertures, a second set of apertures, and a central aperture. Each of the first set of apertures is larger than the second set of apertures and they are equally spaced apart from each other around the center of the ram liner. Each of the second set of apertures is smaller than the first set of apertures and they are equally spaced from each other between the first set of apertures.

The circumferential lip extends vertically from a circumferential edge of the liner wall. The circumferential lip is configured to prevent material from contacting the circumferential surface.

The above-described ram liner and material transfer system provide several advantages. For example, the liner wall and the circumferential lip of the ram liner prevent material from contacting the ram surface and circumferential surface of the ram plate, which significantly reduces the amount of time required to clean the ram plate. The circumferential lip also helps retain the ram liner on the ram plate. The ram liner may be disposable and reusable. In this way, the ram liner could be cleaned in a more efficient manner (e.g., via a cleaning machine) than the ram plate can be cleaned. The apertures have different sizes and positions, which allows the ram liner to be used with various ram plate models and syringe arrangements.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
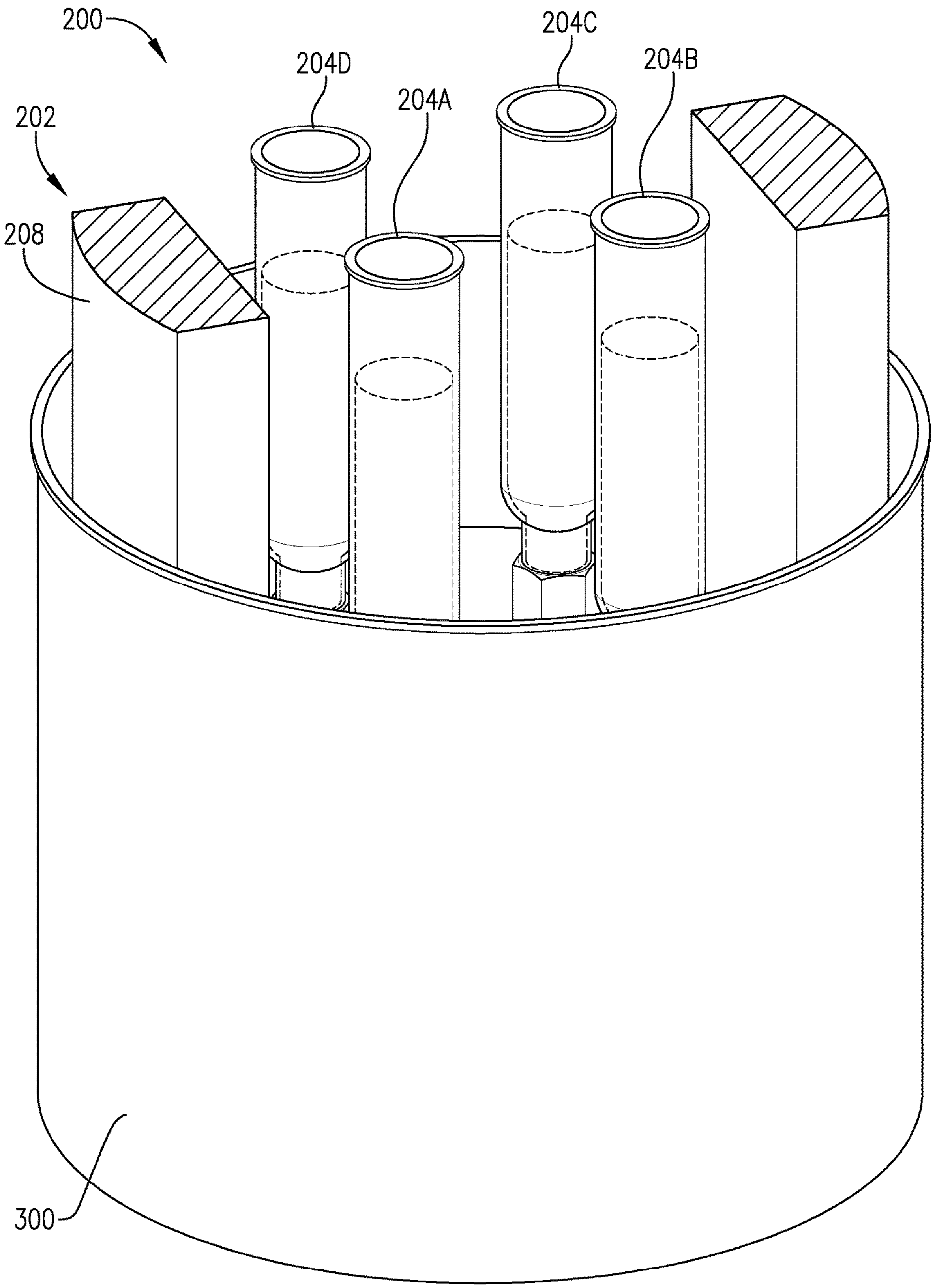
FIG. 1 is a perspective view of a material transfer system constructed in accordance with an embodiment of the invention.
Figure 2:
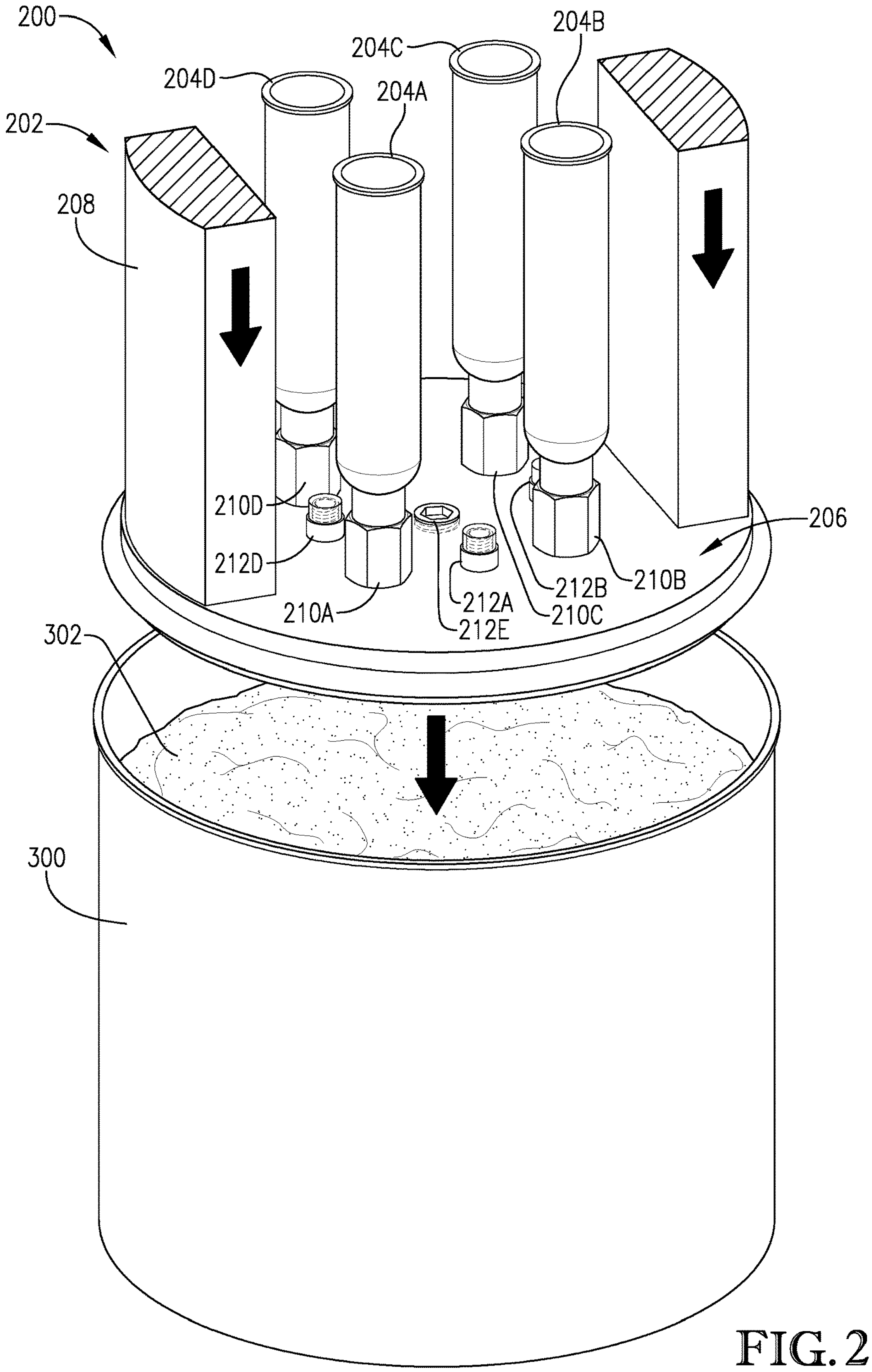
FIG. 2 is another perspective view of the material transfer system of FIG. 1.
Figure 3:
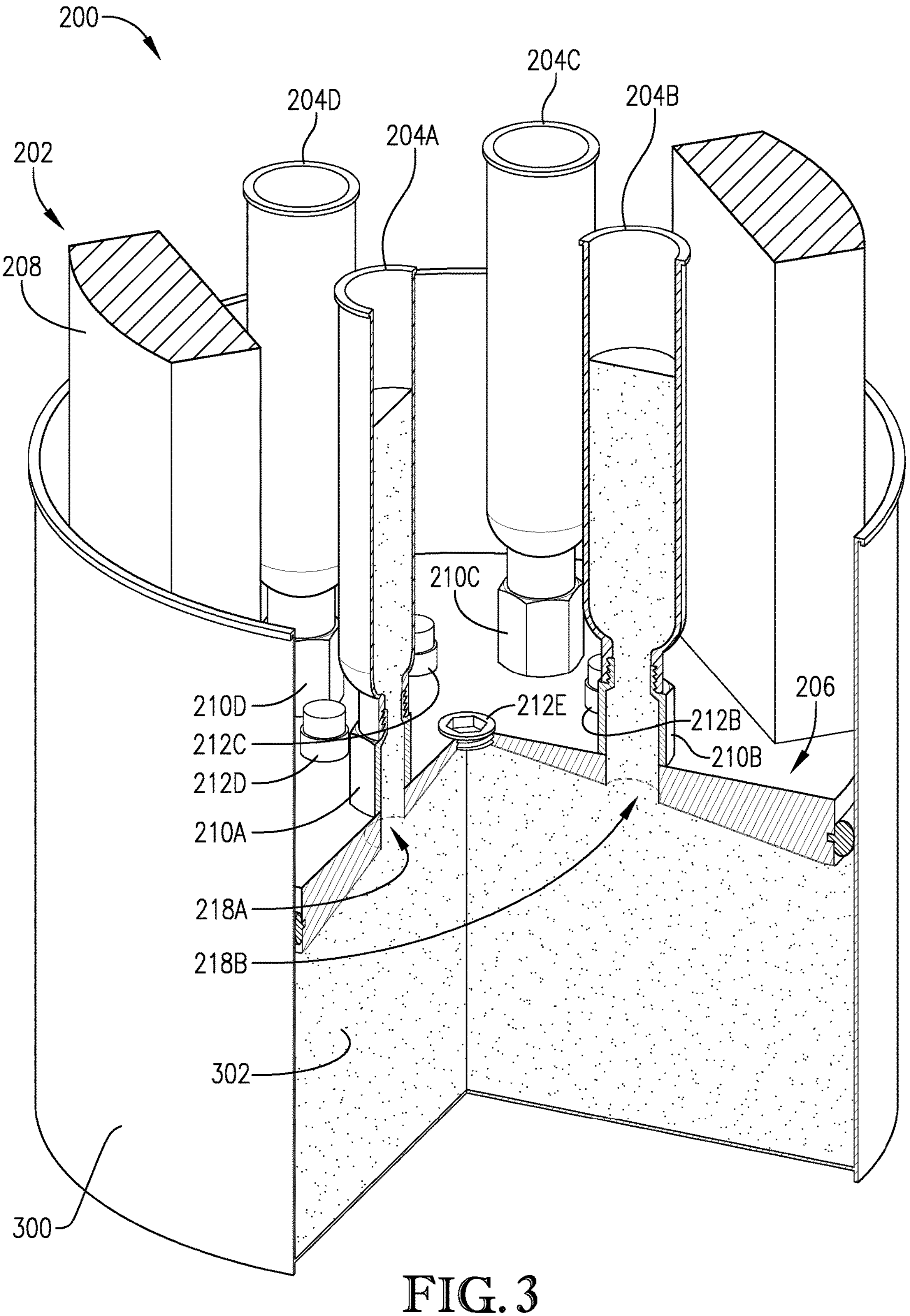
FIG. 3 is a partial cutaway perspective view of the material transfer system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 4:
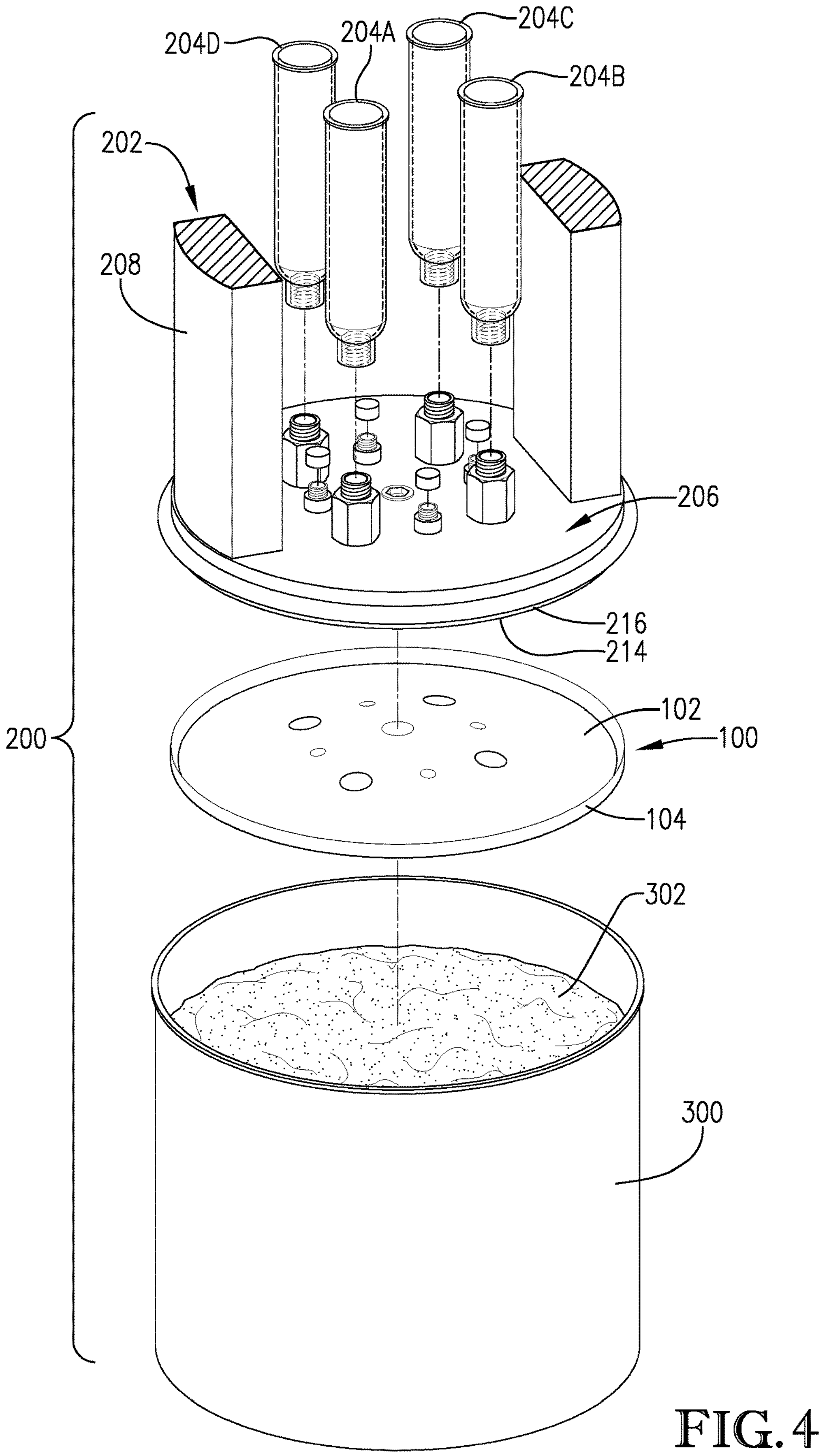
FIG. 4 is an assembly view of the material transfer system of FIG. 1 and a ram liner constructed in accordance with another embodiment of the invention.
Figure 5:
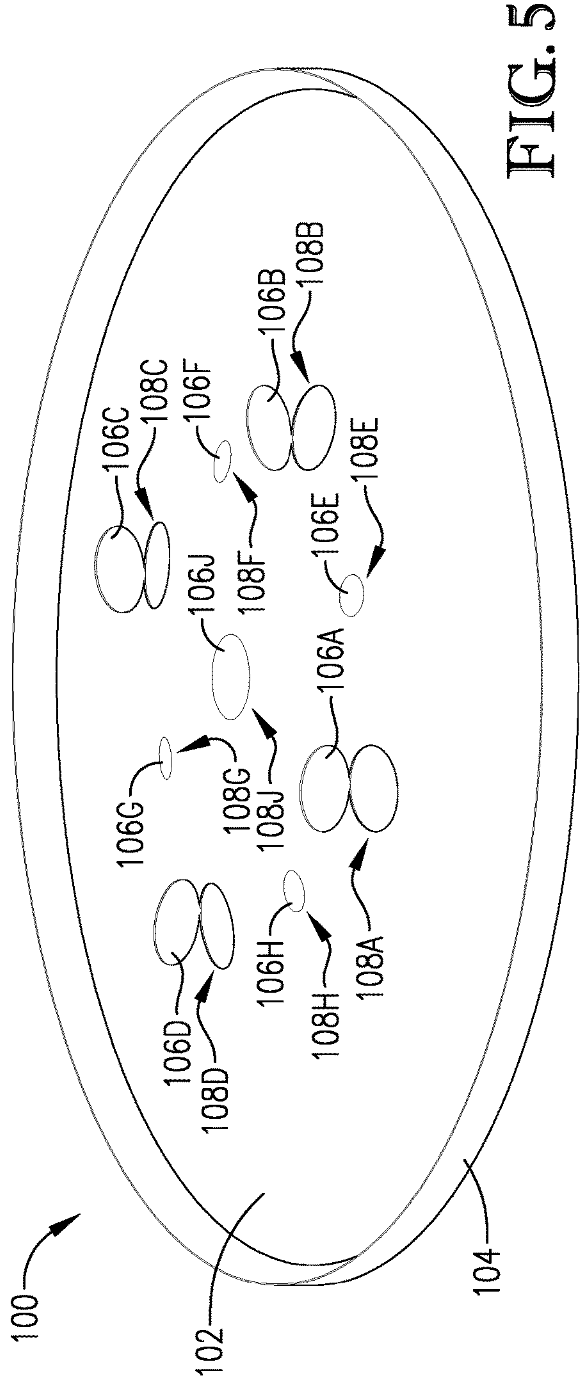
FIG. 5 is a perspective view of the ram liner of FIG. 4.
Figure 6:
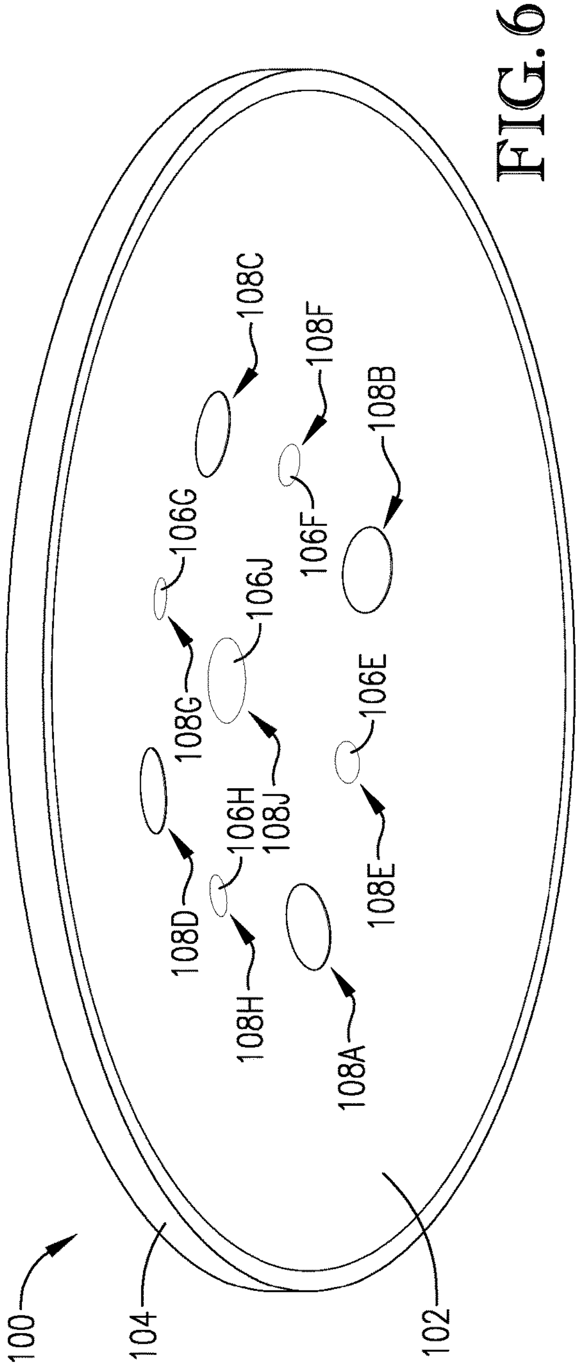
FIG. 6 is a bottom perspective view of the ram liner of FIG. 4.
Figure 7:
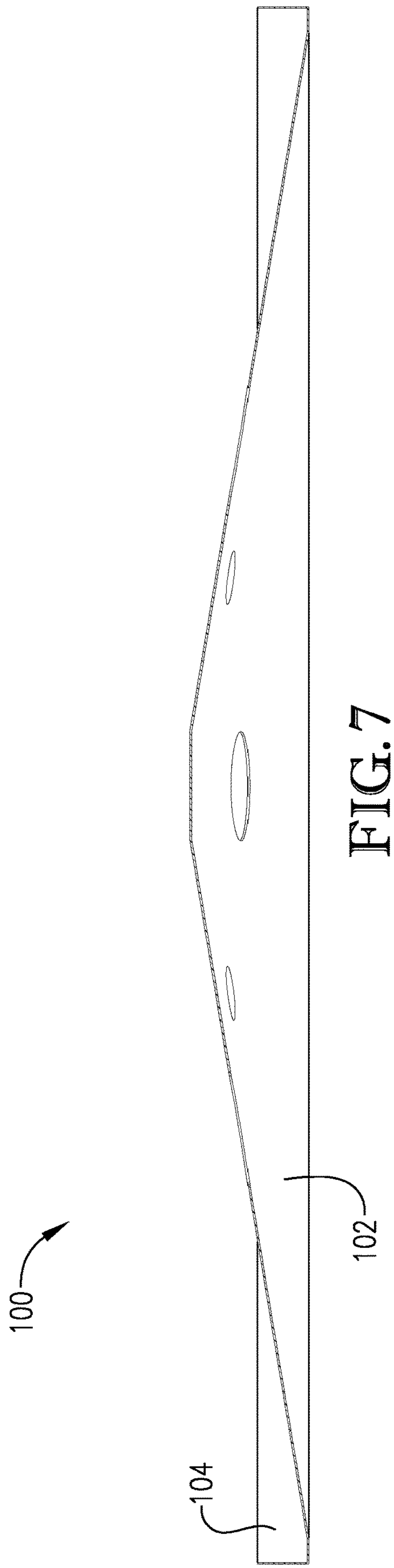
FIG. 7 is a cutaway elevation view of the ram liner of FIG. 1.

Turning to the drawing figures, a material transfer system 200 and ram liner 100 (best seen in FIGS. 4-7) constructed in accordance with an embodiment of the invention is illustrated. The material transfer system 200 transfers a viscous material from a large container into smaller containers and broadly comprises a ram 202 and a plurality of syringes 204A-D.

The ram 202 may include a ram plate 206, an actuator 208, a plurality of valves 210A-D, and a plurality of plugs 212A-E. The ram 202 may be configured to accommodate various syringes or combinations of syringes. The ram 202 is depicted herein as being set up for the plurality of syringes 204A-D.

The ram plate 206 may include a ram surface 214, a circumferential surface 216, and a plurality of apertures 218A-J. The ram plate 206 is configured to be pressed into an open-topped container 300 to compress a material 302 in the open-topped container 300. To that end, the ram plate 206 may have an outer shape similar to the shape of the open-topped container 300. In most cases, the ram plate 206 is circular. However, the ram plate 206 may have any suitable shape to match the shape of a container may be used.

The ram surface 214 normally would contact the material 302 directly but—for the presence of the ram liner 100. Regardless, the ram surface 214 may be shaped to urge the material 302 through certain ones of the plurality of apertures 218A-J. To that end, the ram surface 214 may be convex. This convex shape may be bowl-shaped or conical.

The circumferential surface 216 may extend around a periphery of the ram plate 206. It may be desirable to prevent material 302 from contacting the circumferential surface 216. The circumferential surface 216 may be used for retaining the ram liner 100 on the ram 200.

The plurality of apertures 218A-J may extend through the ram plate 206 and may be spaced apart from each other to accommodate the plurality of syringes. In one embodiment, the plurality of apertures 218A-J may include a first set of apertures 218A-D, a second set of apertures 218E-H, and a central aperture 218J. Other numbers and arrangements of apertures may also be used.

Each of the first set of apertures 218A-D may be larger than the second set of apertures 218E-H and may be equally spaced apart from each other around the center of the ram plate 206. Each of the second set of apertures 218E-H may be smaller than the first set of apertures 218A-D and may be equally spaced from each other between the first set of apertures 218A-D. The central aperture 218J may have a different size than the first set of apertures 218A-D and second set of apertures 218E-H and may be positioned in the center of the ram plate 206.

The actuator 208 may include legs, linkages, push rods, and the like, and a force generator such as a hydraulic, pneumatic, or electric motor. The actuator 208 may be configured to urge the ram plate 206 into the open-topped container 300.

The plurality of valves 210A-D may be positioned on the ram plate 206 opposite the ram surface 214 and may be in fluid connection with the first set of apertures 218A-D. The plurality of valves 210A-D may be butterfly valves, globe valves, ball valves, diaphragm valves, or any other suitable valves. The plurality of valves 210A-D may be configured to selectively partition material 302 that has been pushed into the plurality of syringes 204A-D from the rest of the material 302. This may help retain the material 302 when the ram 202 is retracted from the open-topped container 300 and may ease removal of the ram 202 from the open-topped container 300.

The plurality of plugs 212A-E may be configured to close the second set of apertures 218E-H and the central aperture 218J. The plurality of plugs 212A-E may be configured to be removed from the second set of apertures 218E-H and the central apertures to accommodate syringes of different sizes or connection types.

The plurality of syringes 204A-D may be configured to be connected to the ram plate 206 via the plurality of valves 210A-D for filling with material 302. Syringes of different sizes or connection types may also be connected to the ram plate 206 by removing the plurality of syringes 204A-D and the plurality of plugs 212A-E. This may require the plurality of valves 210A-D or a different set of valves.

The ram liner 100 broadly comprises a liner wall 102 and a circumferential lip 104. The ram liner 100 may be made of a thin plastic material and may be formed via molding, additive manufacturing, subtractive manufacturing, or the like. In the case of molding, specific molding tools may include geometric features to achieve desired knock-out tab and aperture arrangements such as the ones described below.

The liner wall 102 may be a substantially circular disc configured to abut the ram surface 214 of the ram plate 206 and may include a plurality of knock-out tabs 106A-J. The liner wall 102 may be convex (from above) for closely matching the concave shape of the ram surface 214. The liner wall 102 may be configured to prevent the viscous material 302 from contacting the ram surface 214.

The plurality of knock-out tabs 106A-J may include a first set of knock-out tabs 106A-D, a second set of knock-out tabs 106E-H, and a central knock-out tab 106J. Other numbers and arrangements of knock-out tabs may also be used to accommodate different rams.

Each of the first set of knock-out tabs 106A-D may be larger than the second set of knock-out tabs 106E-H and may be equally spaced apart from each other around the center of the ram liner 100. Each of the second set of knock-out tabs 106E-H may be smaller than the first set of knock-out tabs 106A-D and may be equally spaced from each other between the first set of knock-out tabs 106A-D. The central knock-out tab 106J may have a different size than the first set of knock-out tabs 106A-D and second set of knock-out tabs 106E-H and may be positioned in the center of the ram liner 100.

The knock-out tabs 106A-J may be circular discs having circumferential indentations for being sheared from a remainder of the liner wall 102. The liner wall 102 forms a plurality of apertures 108A-J upon removal of the knock-out tabs 106A-J.

The apertures 108A-J may have the same arrangement and configuration as the knock-out tabs 106A-J. That is, the apertures 108A-J may include a first set of apertures 108A-D, a second set of apertures 108E-H, and a central aperture 108J. Each of the first set of apertures 108A-D may be larger than the second set of apertures 108E-H and may be equally spaced apart from each other around the center of the ram liner 100. Each of the second set of apertures 108E-H may be smaller than the first set of apertures 108A-D and may be equally spaced from each other between the first set of apertures 108A-D. The central aperture 108J may have a different size than the first set of apertures 108A-D and second set of apertures 108E-H and may be positioned in the center of the ram liner 100.

The circumferential lip 104 may extend vertically from a circumferential edge of the liner wall 102. The circumferential lip 104 may be configured to prevent material 302 from contacting the circumferential surface 216.

The above-described ram liner 100 has been described with a plurality of apertures, but the ram liner 100 may have only a single aperture corresponding to a single aperture (or one aperture of a plurality of apertures) of a ram plate. In this case, a single syringe may be filled via the single aperture of the ram liner 100. This may be particularly useful if the material transfer system 200 and/or container 300 is stored in a refrigeration unit and syringes are to be filled with refrigerated material as needed instead of first filling syringes and storing the filled syringes in the refrigeration unit.

The above-described ram liner 100 and material transfer system 200 provide several advantages. For example, the liner wall 102 and the circumferential lip 104 of the ram liner 100 prevent material 302 from contacting the ram surface 214 and circumferential surface 216 of the ram plate 206, which significantly reduces the amount of time required to clean the ram plate 206. The circumferential lip 104 also may be used to retain the ram liner 100 on the ram plate 206. The ram liner 100 may be disposable and reusable. In this way, the ram liner 100 could be cleaned in a more efficient manner (e.g., via a cleaning machine) than the ram plate can be cleaned. The apertures 108A-J have different sizes and positions, which allows the ram liner 100 to be used with various ram plate models and syringe arrangements.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A liner for a ram configured to press a viscous material, the ram including a ram plate including a ram surface and a circumferential surface and having a plurality of apertures extending through the ram plate, the liner comprising:
- a liner wall configured to abut the ram plate, the liner wall having a plurality of knock-out tabs configured to be removed to form a plurality of apertures configured to align with the plurality of apertures of the ram plate, the plurality of knock-out tabs being circular discs having circumferential indentations and being configured to be sheared from a remainder of the liner wall via the circumferential indentations; and
- a circumferential lip extending vertically from the liner wall,
- the circumferential lip being configured to prevent material from contacting the circumferential surface,
- the liner wall being configured to prevent the viscous material from contacting the ram surface.

2. The liner of claim 1, the circumferential lip being further configured to retain the liner on the ram plate.

3. The liner of claim 1, the ram plate being concave, the liner wall being convex for abutting the ram plate.

4. The liner of claim 1, the plurality of apertures including four apertures.

5. The liner of claim 1, the liner being disposable.

6. The liner of claim 1, the liner being reusable.

7. The liner of claim 1, the liner being made of a molded plastic material.

8. The liner of claim 1, the liner being circular.

9. A liner for a ram configured to press a viscous material, the ram including a ram plate including a ram surface and having a plurality of apertures extending through the ram plate, the liner comprising:
- a liner wall configured to abut the ram plate, the liner wall having a plurality of knock-out tabs configured to be removed to form a plurality of apertures configured to align with the plurality of apertures of the ram plate;
- the liner wall being configured to prevent the viscous material from contacting the ram surface.

10. The liner of claim 9, the plurality of knock-out tabs including a first set of knock-out tabs having a first size and a second set of knock-out tabs having a second size so that the plurality of apertures have different sizes depending on whether the first set of knock-out tabs or the second set of knock-out tabs are removed.

11. The liner of claim 10, the first set of knock-out tabs including four knock-out tabs equally spaced around a center of the liner, the second set of knock-out tabs being equally spaced around the center of the liner between the first set of knock-out tabs.

12. The liner of claim 10, the plurality of knock-out tabs further including a knock-out tab positioned in a center of the liner such that removal of the central knock-out tab forms an aperture in the center of the liner.

13. The liner of claim 9, the plurality of knock-out tabs being circular discs having circumferential indentations, the plurality of knock-out tabs being configured to be sheared from a remainder of the liner wall via the circumferential indentations.

14. The liner of claim 9, the ram plate further including a circumferential surface, the liner further comprising a circumferential lip extending vertically from the liner wall, the circumferential lip being configured to prevent material from contacting the circumferential surface.

15. The liner of claim 14, the circumferential lip being further configured to retain the liner on the ram plate.

16. The liner of claim 9, the ram plate being concave, the liner wall being convex for abutting the ram plate.

17. The liner of claim 9, the liner being made of a molded plastic material.

18. A liner for a ram configured to press a viscous material, the ram including a ram plate including a ram surface and having a plurality of apertures extending through the ram plate and a circumferential surface, the liner comprising:

a liner wall configured to abut the ram plate, the liner wall having a plurality of knock-out tabs configured to be removed to form a plurality of apertures configured to align with the plurality of apertures of the ram plate, the knock-out tabs including a first set of knock-out tabs having a first size, a second set of knock-out tabs having a second size, and a central knock-out tab having a third size, so that the plurality of apertures have different sizes depending on whether the first set of knock-out tabs, the second set of knock-out tabs, or the central knock-out tab is removed, the first set of knock-out tabs including four knock-out tabs equally spaced around a center of the liner, the second set of knock-out tabs being equally spaced around the center of the liner between the first set of knock-out tabs; and a circumferential lip extending vertically from the liner wall, the liner wall being configured to prevent the viscous material from contacting the ram surface, the circumferential lip being configured to prevent material from contacting the circumferential surface.

* * * * *